(12) United States Patent
Shin

(10) Patent No.: US 6,842,411 B2
(45) Date of Patent: Jan. 11, 2005

(54) OPTICAL DISC DRIVER AND DATA RECORDING METHOD THEREFOR

(75) Inventor: Jong In Shin, Kyounggi-do (KR)

(73) Assignee: LG Electronics, Inc., Seoul (KR)

( * ) Notice: Subject to any disclaimer, the term of this patent is extended or adjusted under 35 U.S.C. 154(b) by 564 days.

(21) Appl. No.: 09/735,645

(22) Filed: Dec. 14, 2000

(65) Prior Publication Data

US 2001/0006497 A1 Jul. 5, 2001

(30) Foreign Application Priority Data

Dec. 22, 1999 (KR) .......................................... 1999-60134
Dec. 22, 1999 (KR) .......................................... 1999-60135

(51) Int. Cl.[7] ................................................. G11B 7/00
(52) U.S. Cl. ................................. 369/47.33; 369/47.31
(58) Field of Search ........................... 369/44.28, 47.33, 369/47.32, 47.34, 47.51, 47.31, 53.12, 53.15

(56) References Cited

U.S. PATENT DOCUMENTS 5,815,472 A * 9/1998 Kuroda et al. ................. 369/32
5,970,208 A * 10/1999 Shim ........................... 386/126
6,357,030 B1 * 3/2002 Demura et al. ........... 369/47.33
6,504,801 B2 * 1/2003 Yamazaki et al. ........ 369/44.28

* cited by examiner

Primary Examiner—Nabil Hindi
(74) Attorney, Agent, or Firm—Birch, Stewart, Kolasch & Birch, LLP

(57) ABSTRACT

Disclosed is a data recording method for an optical disc driver comprising the steps of receiving a data recording command, encoding data to be recorded in a corresponding user region block, storing the encoded data in the unit of an error correction code (ECC) block in a buffer, and recording the data of the ECC blocks if the number of the ECC blocks stored in the buffer is larger than the predetermined number of the ECC blocks. In encoding the data to be recorded, if the data to be recorded is the data in the unit of a sector, the data of the ECC block of the user region corresponding to the sector is reproduced, the data to be newly recorded is inserted into the data of the reproduced ECC block, and the processed ECC block is encoded. If the data to be recorded is the data in the unit of an ECC block, the ECC block data of the user region is not reproduced, but the ECC block to be recorded is encoded.

9 Claims, 5 Drawing Sheets

| COMMAND ORDER | DATA RECORDING POSITION | NUMBER OF RECORDING SECTOR |
|---|---|---|
| ⋮ | ⋮ | ⋮ |
| n | B | 16 |
| n+1 | B+16 | 16 |
| n+2 | a | 1 |
| n+3 | b | 2 |
| n+4 | B+32 | 16 |
| n+5 | B+48 | 16 |
| ⋮ | ⋮ | ⋮ |

OPTICAL DISC DRIVER AND DATA RECORDING METHOD THEREFOR

BACKGROUND OF THE INVENTION

1. Field of the Invention

The present invention relates to an optical disc driver, and more particularly to an optical disc driver and a data recording method for the optical disc driver which can reduce a data recording time by separating a data reproducing process from a data recording process in recording data and reducing the number of seeks of a servo.

Also, the present invention relates to an optical disc driver and a data recording method for the optical disc driver which can reduce the number of seeks of a servo and thus reduce a data recording time by performing a data reproduction only with respect to the first data recording command and the last data recording command, and performing an encoding of respective error correction code (ECC) blocks with respect to sequential intermediate data recording commands without performing the data reproduction in the event that data recording commands which deviate from the boundaries of the ECC blocks are sequentially received.

2. Description of the Related Art

Generally, an optical recording medium is classified into three types depending on whether or not data can be repeatedly recorded on the medium: a read only memory (ROM) type, a write once read many (WORM) type on which data can be written only once, and a rewritable type on which data can be repeatedly written.

As a repeatedly rewritable disk, there exist a rewritable compact disc (CD-RW) and a rewritable digital versatile disc (DVD-RAM).

Meanwhile, a DVD-RAM drive reproduces user data recorded on a disc, or records the user data transmitted from a host on the disc in accordance with a command of the host. At this time, the host transmits the command that includes a command code, a recording position, and the number of recording sectors.

The DVD-RAM drive analyzes the received command, and if it is analyzed that the received command is a data reproduction command, it reproduces the data from the disc, and transmits the reproduced data to the host. If it is analyzed that the received command is a data recording command, the DVD-RAM drive transmits to the host a response signal for notifying the reception of the command, and records the data on the disc as long as the time permitted.

Accordingly, in case of the data reproduction, the host transmits the next command to the drive after receiving all the data from the drive. In case of the data recording, the host transmits all the recorded data to the drive, and if the response signal is received from the drive, it transmits the next command.

Meanwhile, in case that the data recording command for the sequential user blocks is received, if the next data recording command is received after the completion of the data recording, a pickup may pass a portion where the next command is to be performed after performing the current command. In this case, the servo should search again and record the portion to be recorded by performing a back jump. As a result, since the servo should perform the back jump whenever the data recording command is received, the recording performance greatly deteriorates.

FIG. 1 is a view conceptually illustrating the data storage state of a general optical disc.

In FIG. 1, 'A−16', 'A', 'A+16', 'A+32', and 'a' denote addresses of the optical disc. The disc is divided into virtual boundaries for addresses corresponding to "0" and multiples of "16" after being manufactured. These boundaries are called ECC block boundaries. An ECC block is a unit of the data process when the data is recorded on the disc.

For instance, if a command to reproduce data of an 'x' portion that starts from the 'a' address in FIG. 1 is received from the host, the data to be transmitted to the host is only the data of the 'x' portion, but the optical disc driver should read out the data of the whole 'X' portion including 'y1', 'x', and 'y2' portions to reproduce the data of the 'x' portion.

Also, in case of recording the data on the disc, if a command to recording the data on the 'x' portion of the disc is received, the optical disc driver should encode and record in the unit of an ECC block not only the data of the 'x' portion but also the data of the 'y1' and 'y2' portions.

As described above, the DVD-RAM drive processes the data in the unit of an ECC block when recording or reproducing the data. However, the host does not necessarily command the recording or reproduction in the unit of an ECC block. At this time, the drive, which has received the data recording command in the unit of a sector from the host, first reproduces the ECC block that includes the sector, inserts the user data transferred from the host in a determined position in the ECC block, and then performs the data recording to match the ECC block by encoding the data. Otherwise, the data of other sectors existing in the ECC block is damaged.

However, if the data recording commands that deviate from the ECC block boundaries are sequentially received, the above-described reproduction/recording operation should be repeated, and this greatly deteriorates the recording speed.

SUMMARY OF THE INVENTION

Therefore, an object of the invention is to solve the problems involved in the related art, and to provide an optical disc driver and a data recording method for the optical disc driver which can reduce a data recording time by separating a data reproducing process from a data recording process in recording the data and reducing the number of seeks of a servo.

It is another object of the present invention to provide an optical disc driver and a data recording method for the optical disc driver which can reduce the movement of the servo and thus reduce a data recording time by performing a data reproduction only with respect to the first data recording command and the last data recording command, and performing an encoding of respective error correction code (ECC) blocks with respect to sequential intermediate data recording commands without performing the data reproduction in the event that data recording commands which deviate from the boundaries of the ECC blocks are sequentially received.

It is still another object of the present invention to provide an optical disc drive system which can reduce the number of seeks of a servo, and perform an efficient data recording.

In one aspect of the present invention, there is provided an optical disc driver comprising:

a data processor for processing data read out from an inserted disc and data to be recorded on the disc;

a memory section for storing the data in the unit of an error correction code (ECC) block read/written by the data processor;

a buffer for encoding and storing data blocks to be recorded on the disc by the data processor; and a controller for controlling the data processor, and controlling a command to record on the disc the data of the ECC blocks stored in the buffer if the number of the ECC blocks stored in the buffer becomes larger than the predetermined number of the ECC blocks.

In another aspect of the present invention, there is provided a data recording method for an optical disc driver comprising the steps of:

(a) receiving a data recording command;

(b) analyzing the received data recording command, and encoding data to be recorded in a corresponding user region block;

(c) storing the encoded data in the unit of an error correction code (ECC) block in a buffer; and (d) recording the data of the ECC blocks stored in the buffer if the number of the ECC blocks stored in the buffer is larger than the predetermined number of the ECC blocks.

Here, in encoding the data to be recorded at step (b), if the data to be recorded is the data in the unit of a sector, the data of the ECC block of the user region corresponding to the sector is reproduced, the data to be newly recorded is inserted into the data of the reproduced ECC block, and the processed ECC block is encoded.

Also, in encoding the data to be recorded at step (b), if the data to be recorded is the data in the unit of an ECC block, the ECC block data of the user region is not reproduced, but the ECC block to be recorded is encoded.

Also, the ECC block data stored in the buffer at step (c) is recorded if no data recording command is newly received until a predetermined time elapses from the time when the data recording command is received.

In still another aspect of the present invention, there is provided an optical disc driver comprising;

a data processor for processing data read out from an inserted disc and data to be recorded on the disc;

a memory section for storing the data in the unit of an error correction code (ECC) block read/written by the data processor;

a buffer for encoding and storing data blocks to be recorded on the disc by the data processor; and a controller for controlling the data processor, and in the event that the data recording commands which deviate from boundaries of the ECC blocks are sequentially received, performing a data reproduction only with respect to a first data recording command and a last data recording command, and performing an encoding of the respective ECC blocks with respect to sequential intermediate data recording commands without performing the data reproduction.

In still another aspect of the present invention, there is provided a data recording method for an optical disc driver comprising the steps of:

(i) receiving a data recording command;

(j) analyzing the data recording command received at step (i), and detecting a user region block where the data is recorded;

(k) detecting an error correction code (ECC) block Ec corresponding to the user region block detected at step (j);

(l) judging whether or not the ECC block Ec detected at step (k) is connected to an ECC block Ep processed in accordance with a previously received data recording command;

(m) if it is judged that the ECC block Ec is connected to the ECC block Ep processed in accordance with a previously received data recording command, judging whether or not an encoding of the data to be recorded in the ECC block Ec is performed;

(n) if it is judged at step (m) that the encoding of the data to be recorded in the ECC block Ec is not performed, inserting the data to be recorded in the ECC block Ec among the data received at step (i) into a predetermined position of the ECC block Ec waiting to perform the encoding; and (o) encoding and recording the data of the ECC block Ec processed at step (n).

Here, if it is judged that the ECC block Ec is not connected to the ECC block Ep processed in accordance with a previously received data recording command as a result of judgement at step (l), the data of the ECC block Ec is reproduced. Also, if it is judged that the encoding of the data to be recorded in the ECC block Ec is performed as a result of judgement at step (m), the data of the ECC block Ec is reproduced.

In still another aspect of the present invention, there is provided an optical disc drive system comprising:

a disc;

a data processor for processing data read out from the disc and data to be recorded on the disc;

a memory section for storing the data in the unit of an error correction code (ECC) block read/written by the data processor;

a buffer for encoding and storing data blocks to be recorded on the disc by the data processor;

a controller for controlling the data processor, controlling a command to record on the disc the data of the ECC blocks stored in the buffer if the number of the ECC blocks stored in the buffer becomes larger than the predetermined number of the ECC blocks, and in the event that data recording commands which deviate from boundaries of the ECC blocks are sequentially received, performing a data reproduction only with respect to the first data recording command and the last data recording command, and performing an encoding of the respective ECC blocks with respect to the sequential intermediate data recording commands without performing the data reproduction; and a host for requesting the data to the controller.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Hereinafter, the present invention will be described with respect to the preferred embodiments illustrated in the annexed drawings.

Figure 1:
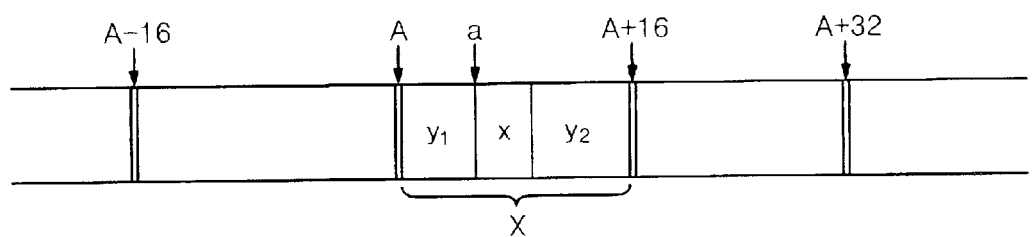
FIG. 1 is a view conceptually illustrating the data storage state of a general optical disc.
Figure 2:
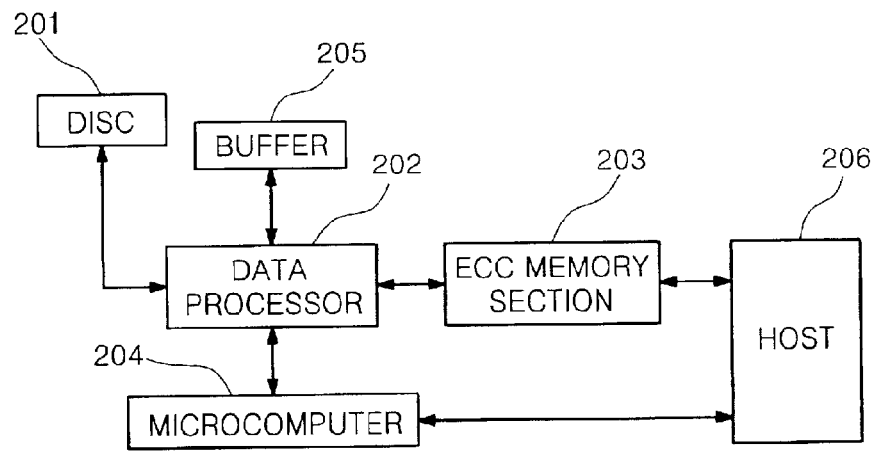
FIG. 2 is a block diagram of an optical disc drive system for implementing a data recording method according to the present invention.

FIG. 2 is a block diagram of an optical disc drive system for implementing a data recording method according to the present invention.

Referring to FIG. 2, the optical disc drive system for implementing the data recording method for an optical disc driver according to the present invention includes a disc 201; a data processor 202 for processing data read out from the disc 201 and data to be recorded on the disc 201; an EEC memory section 203 for storing the data in the unit of an ECC block read/written by the data processor 202; a buffer 205 for encoding and storing data blocks to be recorded on the disc 201 by the data processor 202; a controller, for example, a microcomputer 204, for controlling the data processor 202, controlling a command to record on the disc 201 the data of the ECC blocks stored in the buffer 205 if the number of ECC blocks stored in the buffer 205 becomes larger than the predetermined number of ECC blocks, and in the event that data recording commands which deviate from boundaries of the ECC blocks are sequentially received, performing a data reproduction only with respect to the first data recording command and the last data recording command, and performing an encoding of the respective ECC blocks with respect to the sequential intermediate data recording commands without performing the data reproduction; and a host 206 for requesting the data to the microcomputer 204.

Figures 3, 4:
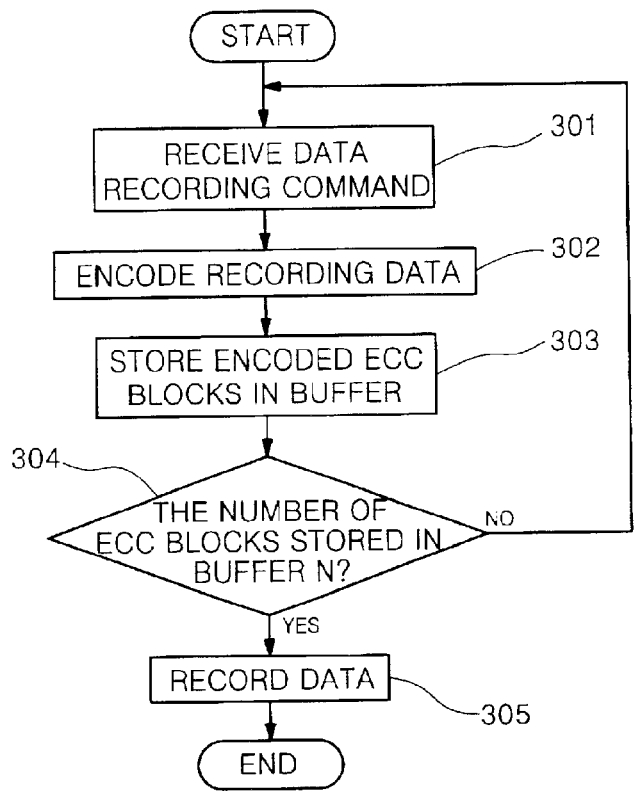
FIG. 3 is a flowchart illustrating a data recording method for an optical disc driver according to an embodiment of the present invention.
FIG. 4 is a view illustrating a portion of data recording commands sequentially received.

The data recording method for an optical disc driver according to the present invention in relation to the optical disc drive system as constructed above will be explained. FIG. 3 is a flowchart illustrating the data recording method for an optical disc driver according to an embodiment of the present invention.

Referring to FIG. 3, if the data recording command is received from the host 206 (step 301), the received data recording command is analyzed, and the data to be recorded in a corresponding user region block is encoded (step 302).

Here, if the data to be recorded is the data in the unit of a sector, the data of the ECC block of the user region corresponding to the sector is reproduced, the data to be recorded is inserted into the data of the reproduced ECC block, and then the processed ECC block is encoded.

Also, if the data to be recorded is the data in the unit of an ECC block, the ECC block data of the user region is not reproduced, but the ECC block to be recorded is encoded.

The data in the unit of the ECC block encoded at step 302 is stored in the buffer 205 (step 303), an then it is judged whether or not the number of the ECC blocks stored in the buffer 205 is larger than the predetermined number of the ECC blocks (step 304).

At this time, if the number of the ECC blocks stored in the buffer 205 is equal to or larger than the predetermined number N of the ECC blocks as a result of judgement at step 304, the data of the ECC blocks stored in the buffer 205 is recorded (step 305).

Meanwhile, if the number of the ECC blocks stored in the buffer 205 is not larger than the predetermined number N of the ECC blocks as a result of judgement at step 304, a reception waiting state in that it is confirmed whether or not any data recording command is newly received from the host 206 is effected.

Meanwhile, if the data recording is performed after the number of the ECC blocks stored in the buffer 205 becomes equal to or larger than the predetermined number of the ECC blocks, the data stored in the buffer 205 is not recorded, but is kept to be stored in the buffer 205 in case that the data recording command newly received is delayed or does not exist.

Accordingly, the ECC block data stored in the buffer 205 is recorded if no data recording command is newly received until a predetermined time elapses from the time when the data recording command is received.

Figure 5:
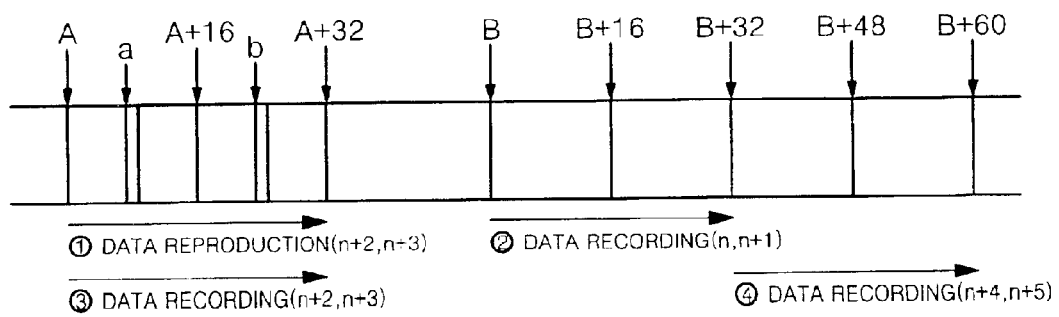
FIG. 5 a view conceptually illustrating the seek order of the servo and the data storage state in performing the data recording commands of FIG. 4 in accordance with the data recording method for an optical disc driver according to the present invention.
Figure 6:
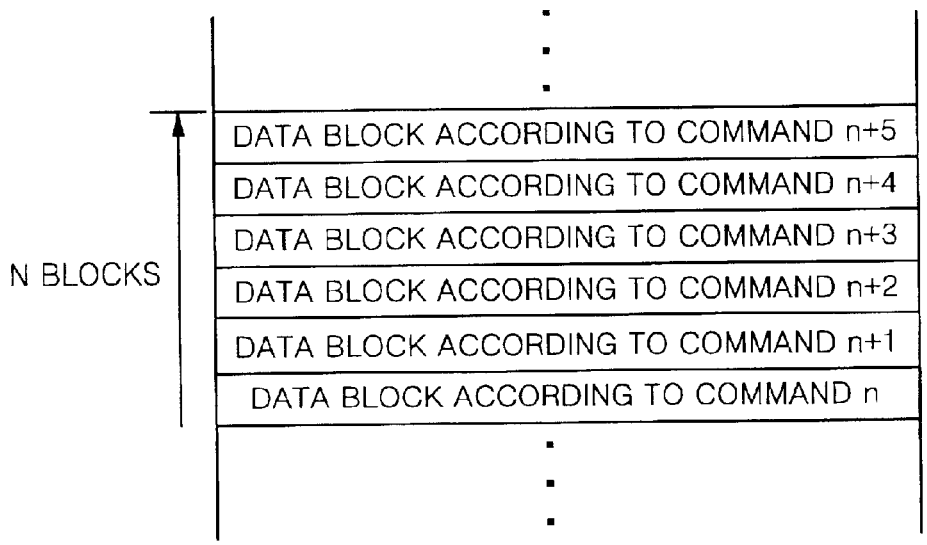
FIG. 6 a view conceptually illustrating the data storage state of the buffer in performing the data recording commands of FIG. 4 in accordance with the data recording method for an optical disc driver according to the present invention.

FIG. 4 is a view illustrating a portion of data recording commands sequentially received, FIG. 5 a view conceptually illustrating the seek order of the servo and the data storage state in performing the data recording commands of FIG. 4 in accordance with the data recording method for an optical disc driver according to the present invention, and FIG. 6 a view conceptually illustrating the data storage state of the buffer in performing the data recording commands of FIG. 4 in accordance with the data recording method for an optical disc driver according to the present invention.

Referring to FIGS. 4, 5, and 6, the data recording method for an optical disc driver according to the present invention in case that the data recording command as shown in FIG. 4 is received will now be explained.

First, in order to perform the command n of FIG. 4, the data received from the host 206 is encoded. The encoded data is then recorded on the designated position.

As shown in FIG. 6, the number of the ECC blocks stored in the buffer 205 to perform the command n is smaller than the predetermined number N of the ECC blocks. Thus, the data recording is not performed, but the data recording command newly received is processed. Also, the data received in accordance with the command n+1 is encoded and stored in the buffer 205.

Meanwhile, since the command n+2 is the data recording command in the unit of a sector, the data reproduction is required. Accordingly, the servo moves to the address A, and the data for 16 sectors are reproduced from the address A. If the data recording command n+3 in the unit of a sector is received before the data reproduction effected by the command n+2 is completed, the data reproduction effected by the command n+3 is sequentially performed. Then, the data received from the host 206 is encoded in one sector from the address a, and the data received from the host 206 is encoded in two sectors from the address b and then stored in the buffer 205.

Also, the data received from the host 206 in accordance with the command n+4 and the command n+5 is encoded and stored in the buffer 205. Accordingly, as shown in FIG. 6, the number of the ECC blocks stored in the buffer 205 becomes equal to the predetermined number N of the ECC blocks. Thus, the data recording is performed by the received commands.

As the data recording is performed as described above, the seek order of the servo and the data storage state are shown in FIG. 5. By the first seek, the servo moves to the address A to perform the command n+2, and performs the data reproduction in accordance with the command n+2 and the command n+3. By the remaining three seeks, the servo moves to the address where the data is to be recorded to record the data stored in the buffer 205.

As a result, according to the data recording method for an optical disc driver according to the present invention, the data reproducing process and the data recording process are separated and performed separately.

As described above, according to the data recording method for an optical disc driver according to the present invention, the data blocks to be recorded are encoded and stored in the buffer, and if the size of the stored data exceeds a predetermined size, the data recording is performed. Thus, the data reproducing process and the data recording process are separated, and the number of seeks of the servo is reduced, thereby reducing the data recording time.

Figure 7:
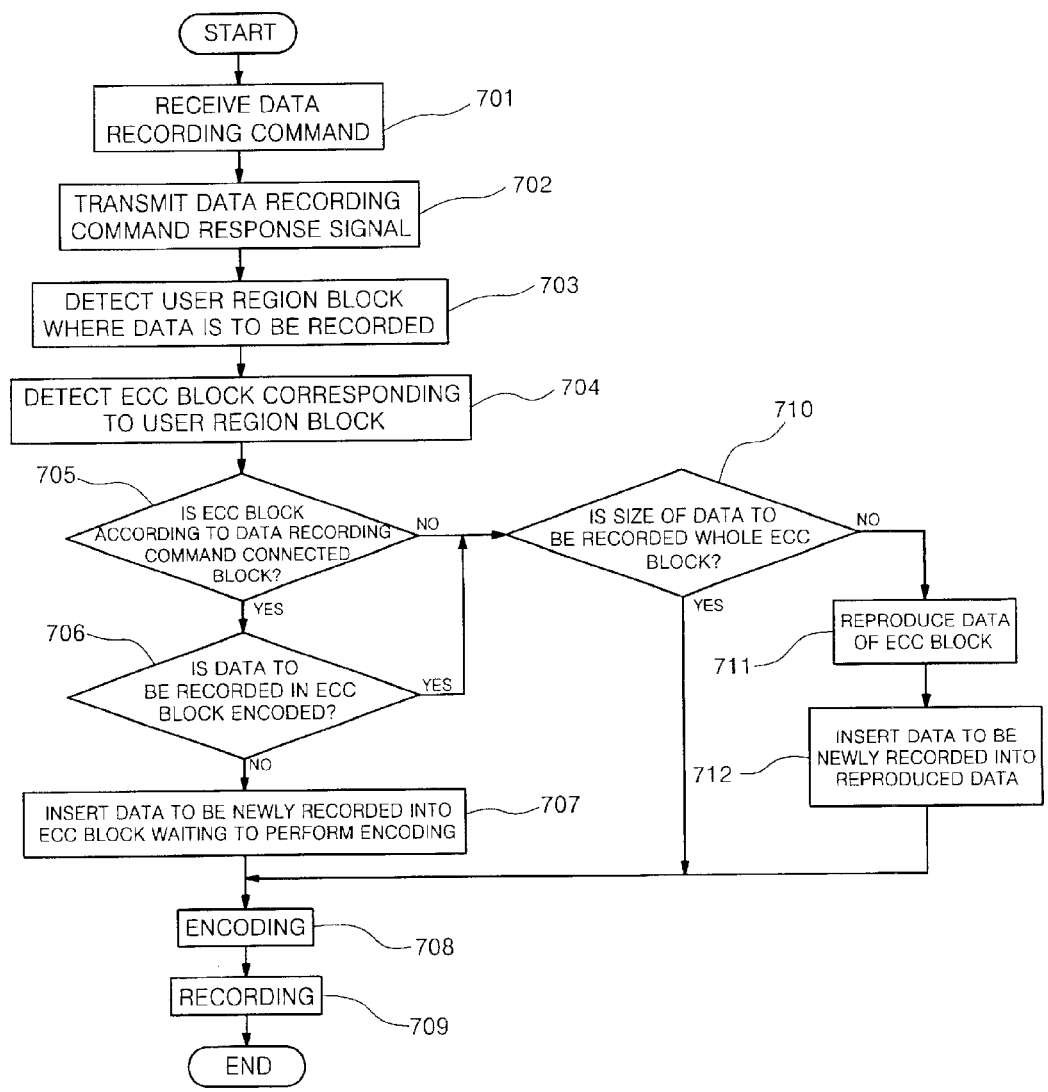
FIG. 7 is a flowchart illustrating a data recording method for an optical disc driver according another embodiment of the present invention.

Meanwhile, the data recording method for an optical disc driver according to another embodiment of the present invention will be explained in relation to the optical disc drive system having the construction as shown in FIG. 2. FIG. 7 is a flowchart illustrating the data recording method for an optical disc driver according another embodiment of the present invention.

Referring to FIG. 7, if the data recording command is received from the host 206 (step 701), the microcomputer 204 transmits the response signal notifying that the transmitted data recording command is successfully received (step 702).

Then, the microcomputer 204 analyzes the data recording command received from the host 206, and detects a user region block where the data is recorded (step 703). Also, the microcomputer 204 detects the ECC block Ec corresponding to the detected user region block (step 704), and judges whether or not the detected ECC block Ec is connected to an ECC block Ep processed in accordance with the previously received data recording command (step 705).

At this time, if the ECC block Ec is connected to the ECC block Ep processed in accordance with the previously received data recording command as a result of judgement at step 705, the microcomputer 204 judges whether or not an encoding of the data to be recorded in the ECC block Ec is performed (step 706).

If the encoding of the data to be recorded in the ECC block Ec is not performed as a result of judgement at step 706, the microcomputer 204 inserts the data to be recorded in the ECC block Ec among the data received from the host 206 at step 701 into a predetermined position of the ECC block Ec that waits to perform the encoding (step 707). The data of the ECC block Ec as processed above is encoded (step 708), and then recorded on the disc 201 (step 709).

Meanwhile, if the ECC block Ec is not connected to the ECC block Ep processed in accordance with the previously received data recording command as a result of judgement at step 705, the microcomputer 204 judges whether or not the size of the data to be newly recorded is equal to the size of the ECC block Ec (step 710).

At this time, if the size of the data to be newly recorded is equal to the size of the ECC block as a result of judgement at step 710, the microcomputer 204 does not reproduce the data stored in the ECC block, but directly encodes the data to be newly recorded (step 708), and records the encoded data on the disc 201 (step 709). This is because the data stored in the existing ECC block is not required to be reproduced since the size of the data newly recorded is equal to the size of the ECC block.

Meanwhile, if the encoding of the data to be recorded in the ECC block Ec is performed as a result of judgement at step 706, the microcomputer 204 performs the process after the step 710.

Figure 8:
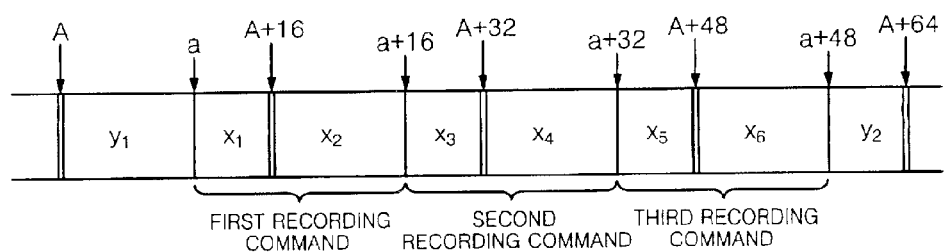
FIG. 8 is a view conceptually illustrating the data storage state in case that data is recorded in a connected data region in performing the data recording in accordance with the reception of the data recording command as shown in FIG. 7.
Figure 9:
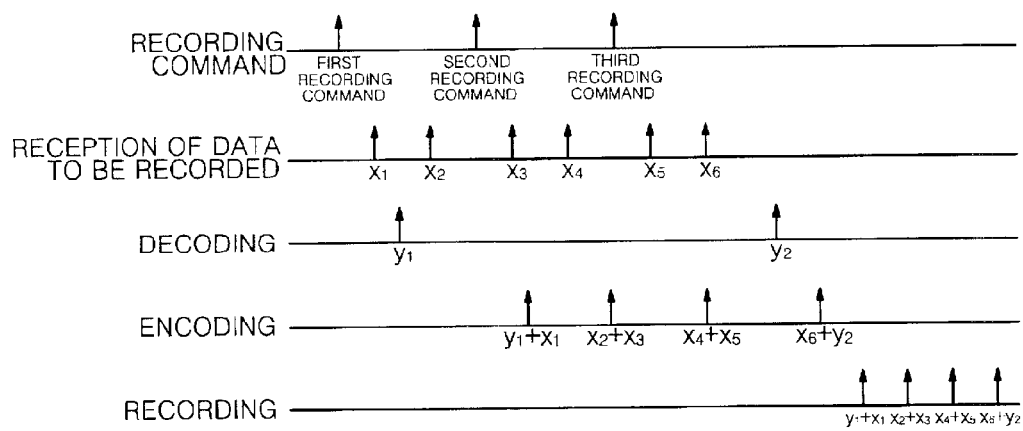
FIG. 9 is a timing diagram illustrating an example of a data processing in accordance with the data recording method for an optical disc driver according to the present invention as shown in FIG. 8.

FIG. 8 is a view conceptually illustrating the data storage state in case that the data is recorded in a connected data region in performing the data recording in accordance with the reception of the data recording command, and FIG. 9 is a timing diagram illustrating an example of the data processing in accordance with the data recording method for an optical disc driver according to the present invention as shown in FIG. 8.

In FIG. 8, 'A', 'A+16', 'A+32', 'A+48', and 'A+64' denote boundaries of the ECC block unit of the disc 201, and 'a', 'a+16', 'a+32', and 'a+48' denote boundaries of data blocks indicated by the data recording command received from the host 206.

If the first recording command is transmitted as shown in FIG. 8, the data for 16 sectors is reproduced from the address A to record the transmitted data of an '$x_1$' region, the data of a '$y_1$' region and the data of the '$x_1$' region are added and encoded, and the data is recorded from the address A. If the second recording command is transmitted during the data recording, the data of an '$x_2$' region and the data of an '$x_3$' region are added, encoded, and recorded from the address A+16 without the necessity of reproducing the data of the '$x_2$' region in the event that the data of the '$x_2$' region are not completely encoded.

That is, the judgement on whether to reproduce the portion to be recorded is determined by checking whether or not the encoding of the block starts. If the encoding of the block does not start, the data received from the host 206 is inserted into the block prepared for the encoding, encoded, and then recorded.

Meanwhile, according to the data processing as shown in the timing diagram of FIG. 9 by the data recording command received from the host 206, the data of the '$y_1$' region is reproduced by the first recording command, and if the data of the '$y_1$' region and the data of the '$x_1$' region are encoded, the data of the '$x_3$' region transferred by the second recording command and the data of the '$x_4$' region are transferred before the '$x_2$' portion is encoded.

Accordingly, the reproduction of the data of the '$x_2$' region in accordance with the second recording command is not performed, but the data of the '$x_2$' region transferred by the first recording command and the data of the '$x_3$' region transferred by the second recording command are added and encoded.

Also, the data processing by a third recording command is identical to the data processing according to the second recording command. In this case, however, since no following data recording command exist after the data of an '$x_6$' region transferred by the third recording command is received, the data of the '$y_2$' region is reproduced, and the data of the '$x_6$' region and the data of the '$y_2$' region are added and encoded. As shown in FIG. 9, after the encoding is completely performed, the data recording is performed.

As described above, according to the data recording method for the optical disc driver according to the present invention, the movement of the servo is reduced and thus the data recording time is reduced by performing a data reproduction only with respect to the first data recording command and the last data recording command, and performing an encoding of the respective ECC blocks with respect to the sequential intermediate data recording commands without performing the data reproduction in the event that data recording commands which deviate from the boundaries of the ECC blocks are sequentially received.

Although the preferred embodiments of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An optical disc driver comprising:
   a data processor for processing data read out from an inserted disc and data to be recorded on the disc;
   a memory section for storing the data in the unit of an error correction code (ECC) block read/written by the data processor;
   a buffer for temporarily storing data blocks to be recorded on the disc by the data processor; and
   a controller for controlling the data processor, and generating a command to record on the disc the data of the ECC blocks stored in the buffer if the number of the ECC blocks stored in the buffer becomes larger than the predetermined number of the ECC blocks.

2. A data recording method for an optical disc driver comprising the steps of:
   (a) receiving a data recording command;
   (b) analyzing the received data recording command at least to determine an unit of data to be recorded, and encoding data to be recorded in a corresponding user region block;
   (c) storing the encoded data in the unit of an error correction code (ECC) block in a buffer; and
   (d) recording the data of the ECC blocks stored in the buffer after a data unit recorded previously is reproduced and stored in the buffer or not reproduced, based on the result of analyzing step, wherein at step (b), if an unit of the data to be recorded is a sector, the data of the ECC block of the user region corresponding to the sector is reproduced, the data to be newly recorded is inserted into the data of the reproduced ECC block, and the processed ECC block is encoded.

3. A data recording method for an optical disc driver comprising the steps of:
   (a) receiving a data recording command;
   (b) analyzing the received data recording command at least to determine an unit of data to be recorded, and encoding data to he recorded in a corresponding user region block;
   (c) storing the encoded data in the unit of an error correction code (ECC) block in a buffer; and
   (d) recording the data of the ECC blocks stored in the buffer after a data unit recorded previously is reproduced and stored in the buffer or not reproduced, based on the result of analyzing step, wherein at step (b), if an unit of the data to be recorded is an ECC block, the ECC block data of the user region is not reproduced, but the ECC block to be recorded is encoded.

4. A data recording method for optical disc driver comprising the steps of:

(a) receiving a data recording command;
(b) analyzing the received data recording command at least to determine an unit of data to be recorded, and encoding data to be recorded in a corresponding user region block;
(c) storing the encoded data in the unit of an error correction code (ECC) block in a buffer; and
(d) recording the data of the ECC blocks stored in the buffer after a data unit recorded previously is reproduced and stored in the buffer or not reproduced, based on the result of analyzing step, wherein the ECC block data stored in the buffer at step (c) is recorded if no data recording command is newly received until a predetermined time elapses from the time when the data recording command is received.

5. An optical disc driver comprising:
   a data processor for processing data read out from an inserted disc and data to be recorded on the disc;
   a memory section for storing the data in the unit of an error correction code (ECC) block read/written by the data processor;
   a buffer for temporarily storing data blocks to be recorded on the disc by the data processor; and
   a controller for controlling the data processor, and in the event that the data recording commands which deviate from boundaries of the ECC blocks are sequentially received, performing a data reproduction only with respect to a first data recording command and a last data recording command, and performing an encoding of the respective ECC blocks with respect to sequential intermediate data recording commands without performing the data reproduction.

6. A data recording method for an optical disc driver comprising the steps of:
   (i) receiving a data recording command;
   (j) analyzing the data recording command received at step (i), and detecting a user region block where the data is recorded;
   (k) detecting an error correction code (ECC) block Ec corresponding to the user region block detected at step (j);
   (l) judging whether or not the ECC block Ec detected at step (k) is connected to an ECC block Ep processed in accordance with a previously received data recording command;
   (m) if it is judged that the ECC block Ec is connected to the ECC block Ep processed in accordance with a previously received data recording command, judging whether or not an encoding of the data to be recorded in the ECC block Ec is performed;
   (n) if it is judged at step (m) that the encoding of the data to be recorded in the ECC block Ec is not performed, inserting the data to be recorded in the ECC block Ec among the data received at step (i) into a predetermined position of the ECC block Ec waiting to perform the encoding; and
   (o) encoding and recording the data of the ECC block Ec processed at step (n).

7. The data recording method as claimed in claim 6, wherein if it is judged that the ECC block Ec is not connected to the ECC block Ep processed in accordance with a previously received data recording command as a result of judgement at step (1), the data of the ECC block Ec is reproduced.

8. The data recording method as claimed in claim 6, wherein if it is judged that the encoding of the data to be recorded in the ECC block Ec is performed as a result of judgement at step (m), the data of the ECC block Ec is reproduced.

9. An optical disc drive system comprising:
- a data processor for processing data read out from a disc and data to be recorded on the disc;
- a memory section for storing the data in the unit of an error correction code (ECC) block read/written by the data processor;
- a buffer for temporarily storing data blocks to be recorded on the disc by the data processor;
- a controller for controlling the data processor, generating a command to record on the disc the data of the ECC blocks stored in the buffer if the number of the ECC blocks stored in the buffer becomes larger than the predetermined number of the ECC blocks, and in the event that data recording commands which deviate from boundaries of the ECC blocks are sequentially received, performing a data reproduction only with respect to the first data recording command and the last data recording command, and performing an encoding of the respective ECC blocks with respect to the sequential intermediate data recording commands without performing the data reproduction; and
- a host for requesting the data to the controller.

* * * * *